US012152760B2

(12) United States Patent
Lin et al.

(10) Patent No.: US 12,152,760 B2
(45) Date of Patent: Nov. 26, 2024

(54) ELASTIC ASSEMBLY AND DOWN LAMP

(71) Applicant: Xiamen Topstar Lighting Co., Ltd., Xiamen (CN)

(72) Inventors: Xibin Lin, Xiamen (CN); Yongjie Wu, Xiamen (CN); Jiajie Lai, Xiamen (CN)

(73) Assignee: Xiamen Topstar Lighting Co., Ltd., Xiamen (CN)

( * ) Notice: Subject to any disclaimer, the term of this patent is extended or adjusted under 35 U.S.C. 154(b) by 0 days.

(21) Appl. No.: 18/401,908

(22) Filed: Jan. 2, 2024

(65) Prior Publication Data

US 2024/0133539 A1 Apr. 25, 2024
US 2024/0230065 A9 Jul. 11, 2024

(30) Foreign Application Priority Data

Nov. 3, 2023 (CN) ......................... 202322980266.4

(51) Int. Cl.
*F21V 17/06* (2006.01)
*F21S 8/02* (2006.01)

(52) U.S. Cl.
CPC .............. *F21V 17/06* (2013.01); *F21S 8/026* (2013.01)

(58) Field of Classification Search
CPC ........................................................ F21S 8/026
See application file for complete search history.

(56) References Cited

U.S. PATENT DOCUMENTS

2012/0281410 A1* 11/2012 Wong .................... F21V 21/043 362/249.02
2023/0061006 A1* 3/2023 Fang ....................... F21V 19/04

FOREIGN PATENT DOCUMENTS

CN 215215917 U * 12/2021
CN 217329556 U * 8/2022

OTHER PUBLICATIONS

English translation of Liu CN-217329556-U (Year: 2022).*
English translation of Li CN-215215917-U (Year: 2021).*

* cited by examiner

*Primary Examiner* — Evan P Dzierzynski
(74) *Attorney, Agent, or Firm* — Westbridge IP LLC

(57) ABSTRACT

Disclosed are an elastic assembly and a down lamp. The down lamp includes a lamp body and an elastic assembly. The elastic assembly includes a limiting assembly and a spring. The limiting assembly is provided with a rotating cavity. The fixing end of the spring is rotatably embedded in the rotating cavity, so that a flip angle of a movable end of the spring ranges from 0° to 90°. The present disclosure can enlarge the adjustable angle of the spring and reduce the assembly difficulty of the down lamp.

11 Claims, 6 Drawing Sheets

ELASTIC ASSEMBLY AND DOWN LAMP

CROSS-REFERENCE TO RELATED APPLICATIONS

This application claims priority to Chinese Patent Application No. 202322980266.4, filed on Nov. 3, 2023, the content of which is incorporated herein by reference in its entirety.

TECHNICAL FIELD

The present disclosure relates to the field of lighting fixtures, and in particular to an elastic assembly and a down lamp.

BACKGROUND

With regard to a traditional American-standard down lamp, it is necessary to connect a spring on the down lamp with a Halo barrel (i.e., a fixed barrel) during assembly, while two springs on such down lamps need to be pressed into the Halo barrel at the same time to complete the assembly, and the springs on two sides in the radial direction of the down lamp are both arranged towards the axial direction of the down lamp and the angle of the springs is fixed. The assembly process requires the installer to operate with both hands, which is cumbersome. If the connection of two springs is completed by means of single-side assembly, the springs are easy to pop out from the Halo barrel during the installation process due to the unbalanced stress on the two sides of the down lamp, which may easily lead to deformation or fracture of the Halo barrel.

SUMMARY

The technical problem to be solved by the present disclosure is to provide an elastic assembly and a down lamp, and to reduce the assembly difficulty without easily deforming the Halo barrel.

In order to solve the above-mentioned technical problem, the technical solution adopted by the present disclosure is as follows:

- an elastic assembly including a limiting assembly and a spring;
- the limiting assembly being provided with a rotating cavity, and a fixing end of the spring being rotatably embedded in the rotating cavity, so that a flip angle of a movable end of the spring ranges from 0° to 90°.

Further, the limiting assembly includes a fixing seat and a limiting member;

- the fixing seat being arranged opposite to the limiting member and forming the rotating cavity;
- a lower end of the limiting member being pressed against the fixing end of the spring.

Further, the fixing seat includes a first side, a second side and a third side arranged in sequence;

- a relief notch being formed between the limiting member and the first side and the third side of the fixing seat, respectively, for the spring to flip over.

Further, the limiting member includes a main body and a limiting block;

- the limiting block being connected to the main body and being arranged opposite to the second side of the fixing seat;
- a lower end of the limiting block being provided with an extension portion, the extension portion and a bottom wall of the fixing seat, and a side wall of the main body opposite to the second side and the second side forming the rotating cavity.

Further, the relief notch is provided with a stopper, and when the spring is pressed against the stopper, an included angle formed between a plane where the spring is located and a bottom of the fixing seat ranges from 200 to 60°.

Further, the limiting assembly includes a limiting snap, a base and two symmetrically arranged supports;

- the supports being arranged on the base;
- a side of the support away from the base being provided with a groove for supporting the spring, and the spring being capable of being embedded in the groove;
- an installation notch being formed between the two supports, and the limiting snap being arranged opposite to the installation notch, so that the limiting snap, the two supports and the base form the rotating cavity.

Further, the limiting assembly includes a limiting snap, a base and an elastic retaining arm;

- the elastic retaining arm being arranged on the base;
- the limiting snap being arranged opposite to the plane where the elastic retaining arm is located, and a movable notch for the spring to move being formed between the elastic retaining arm and the base.

Further, the spring includes a first elastic arm, a second elastic arm and a rotating connection portion;

- the first elastic arm and the second elastic arm being connected via the rotating connection portion, and an obtuse angle being formed between the first elastic arm and the second elastic arm;
- the rotating connection portion being reversibly embedded in the fixing seat.

Further, the rotating connection portion includes a torsion portion and a U-shaped connection portion;

- a first end and a second end of the torsion portion being respectively connected to the first elastic arm and the second elastic arm;
- a third end and a fourth end of the torsion portion being respectively connected to two ends of the U-shaped connection portion;
- the U-shaped connection portion being reversibly arranged in the fixing seat, and the U-shaped connection portion being relatively rotatably embedded in the rotating cavity.

In order to solve the above-mentioned technical problem, another technical solution adopted by the present disclosure is as follows:

- a down lamp including a lamp body and an elastic assembly as described above;
- the lamp body being provided with at least two symmetrically arranged elastic assemblies in the radial direction.

The advantageous effect of the present disclosure is that: according to the present disclosure, a rotating cavity is formed in the limiting assembly, and the fixing end of the spring is embedded in the rotating cavity, so that the movable end of the spring can be flipped over between 0° and 90° relative to the fixing seat with the fixing end of the spring as a rotating fulcrum, as a result, the position of the movable end of the spring can be changed at a larger angle, the flexibility is improved, and the assembly difficulty is reduced.

DETAILED DESCRIPTION OF THE EMBODIMENTS

Figure 1:
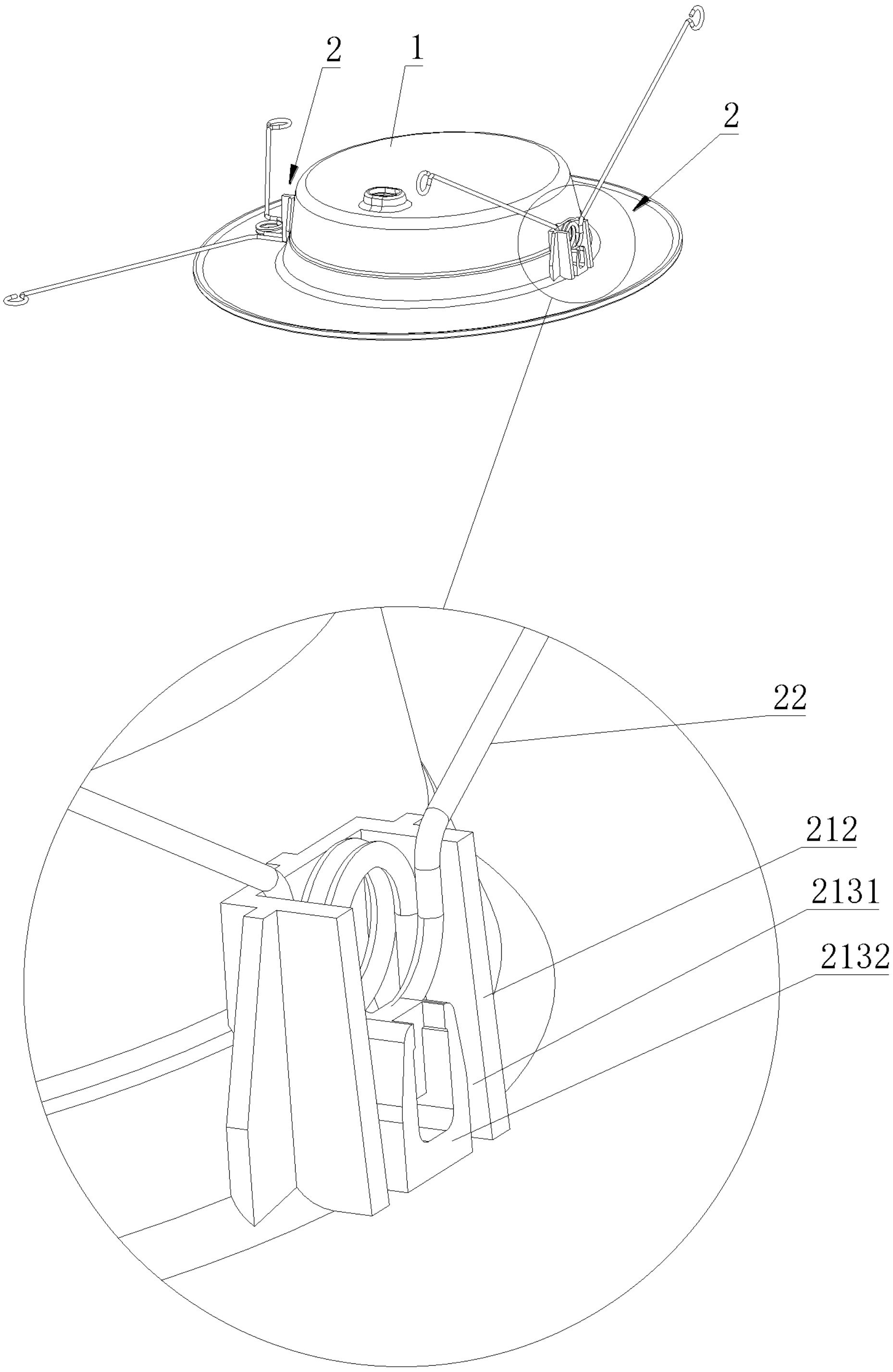
FIG. 1 is a schematic structural diagram and a partially enlarged view of a down lamp according to the first embodiment of the present disclosure.
Figure 2:
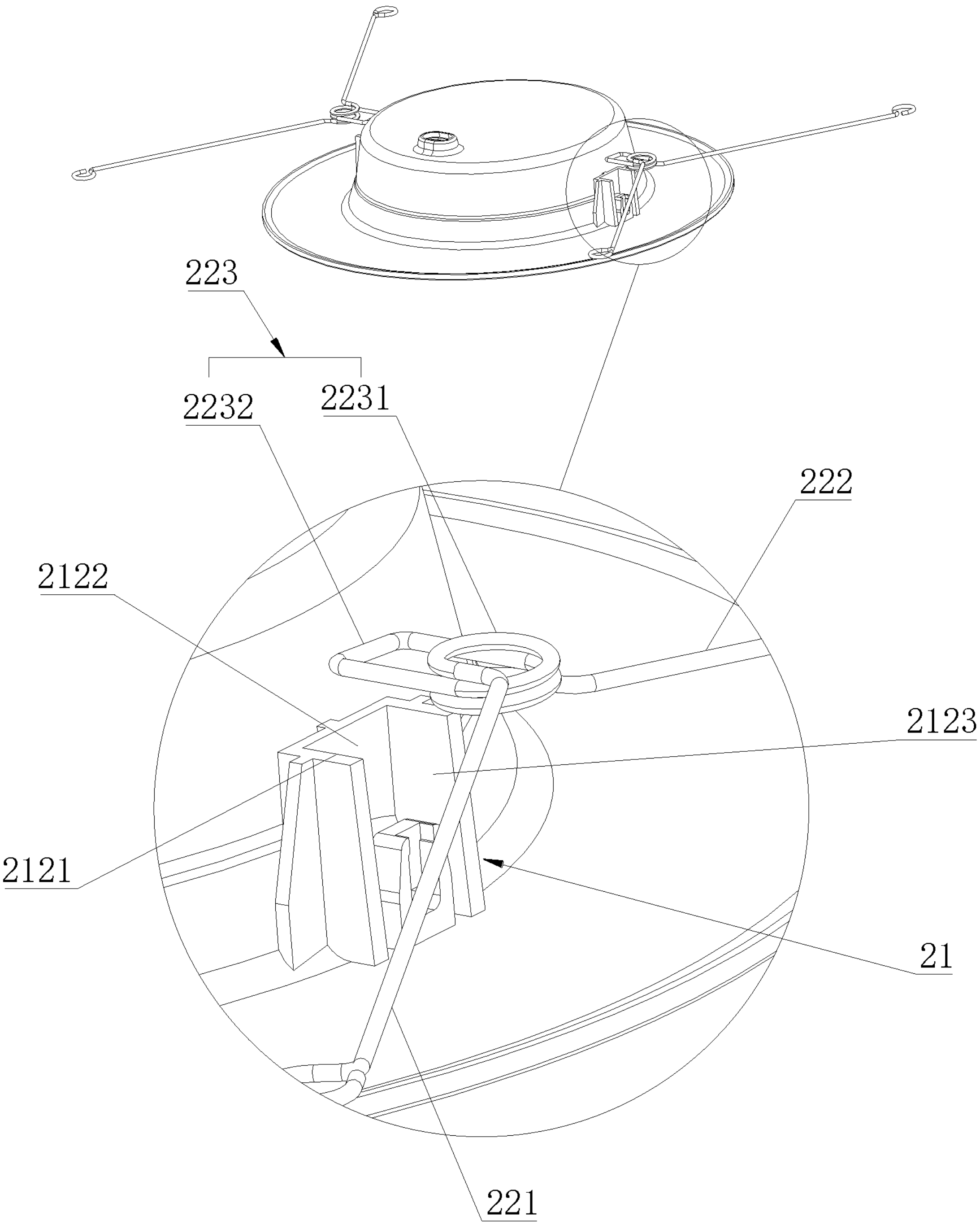
FIG. 2 is an exploded view and a partially enlarged view of a down lamp according to the first embodiment of the present disclosure.
Figure 3:
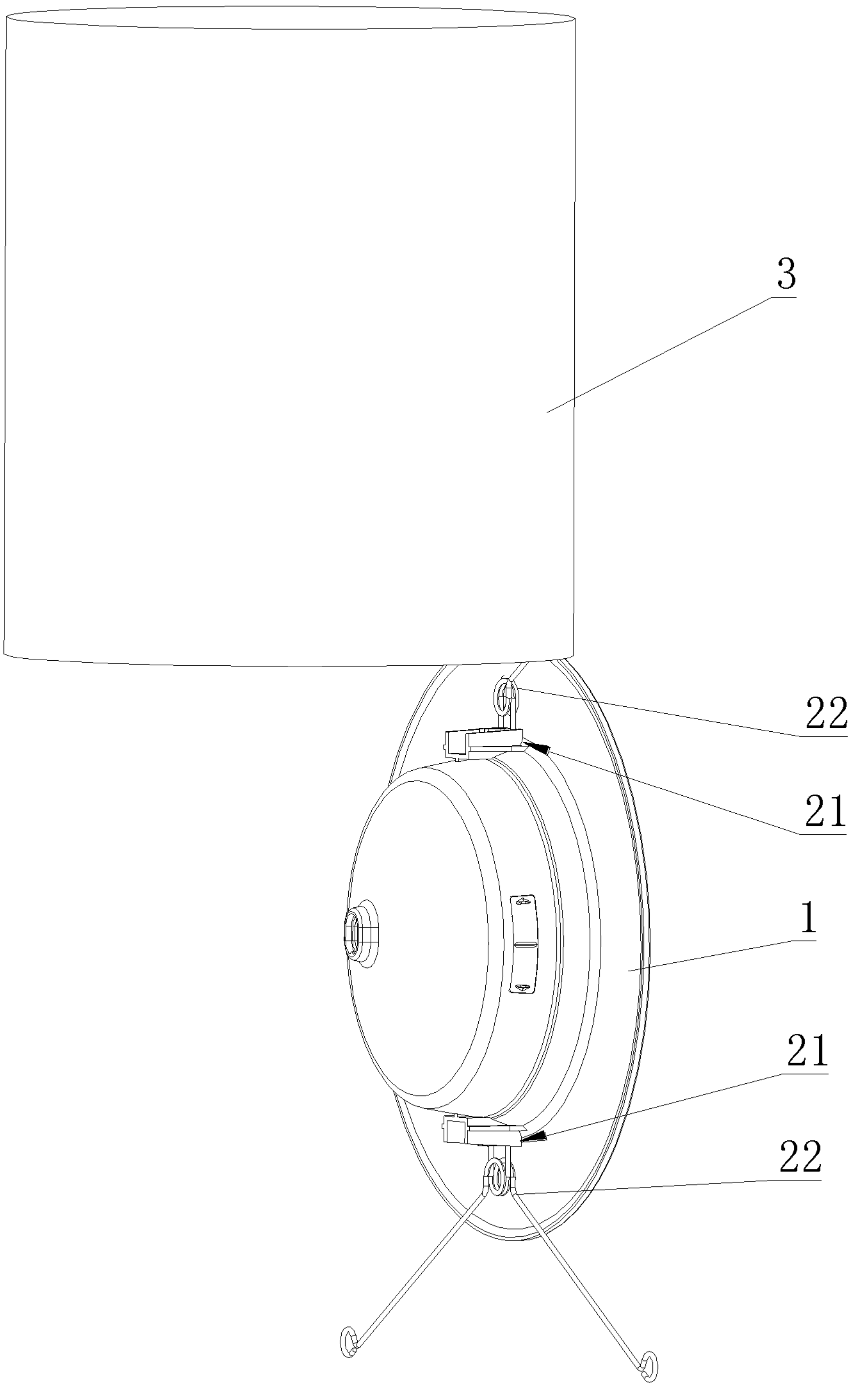
FIG. 3 is a schematic structural diagram of installing a down lamp and a Halo barrel according to the first embodiment of the present disclosure.
Figure 4:
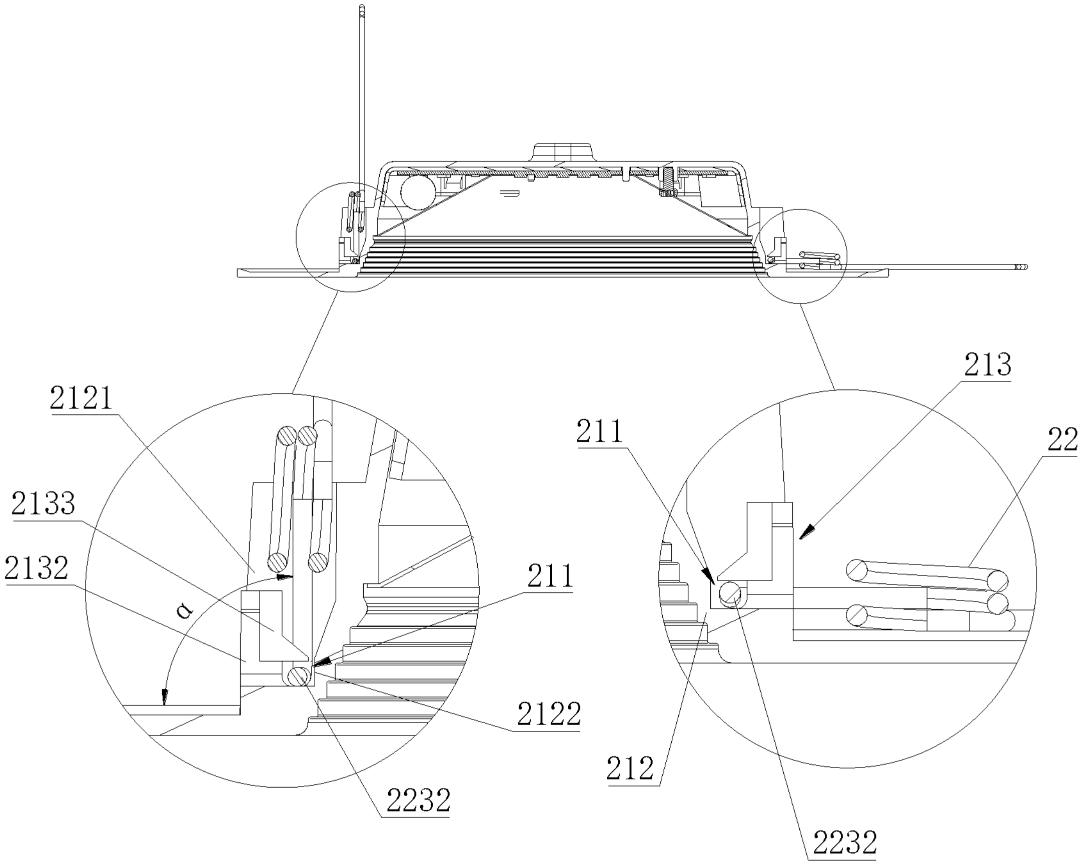
FIG. 4 is a cross-sectional view of a down lamp according to the first embodiment of the present disclosure.

In order to explain the technical contents, the objects, and the effects of the present disclosure in detail, the embodiments will be described below with reference to the accompanying drawings.

Referring to FIGS. 1 to 9, a down lamp includes a lamp body 1 and an elastic assembly 2. The lamp body 1 is provided with at least two symmetrically arranged elastic assemblies 2 in a radial direction. The elastic assembly 2 includes a limiting assembly 21 and a spring 22. The limiting assembly 21 is provided with a rotating cavity 211. A fixing end of the spring 22 is rotatably embedded in the rotating cavity 211, so that a flip angle α of a movable end of the spring 22 ranges from 0° to 90°.

It can be understood that, according to the present disclosure, a rotating cavity 211 is formed in the limiting assembly 21, and the fixing end of the spring 22 is embedded in the rotating cavity 211, so that the movable end of the spring 22 can be flipped over between 0° and 90° relative to the fixing seat 212 with the fixing end of the spring 22 as a rotating fulcrum, as a result, the position of the movable end of the spring 22 can be changed at a larger angle, the flexibility is improved, and the assembly difficulty is reduced.

In some embodiments, the spring 22 includes a first elastic arm 221, a second elastic arm 222, and a rotating connection portion 223; the first elastic arm 221 and the second elastic arm 222 are connected via the rotating connection portion 223, and an obtuse angle is formed between the first elastic arm 221 and the second elastic arm 222; the rotating connection portion 223 is reversibly embedded in the fixing seat 212. The first elastic arm 221 and the second elastic arm 222 are provided to maintain a close connection relationship with the Halo barrel 3, and the rotating connection portion 223 is provided, on the one hand, to connect the first elastic arm 221 and the second elastic arm 222, and on the other hand, to relatively rotatably connect the rotating cavity 211, so as to drive the first elastic arm 221 and the second elastic arm 222 to flip over, thereby achieving the adjustment of the installation angle of the first elastic arm 221 and the second elastic arm 222. Particularly, the flip angle of the movable end of the spring 22, i.e., the flip angle which can be achieved by the plane formed by the first elastic arm 221 and the second elastic arm 222, can make both the springs 22 lie on the same plane, and during the installation process, one of the springs 22 can be firstly embedded in the Halo barrel 3, and then the other spring 22 is loaded, thus reducing the assembly difficulty. In addition, since the angular adjustable range of the first elastic arm 221 and the second elastic arm 222 is large, the 5-inch and 6-inch Halo barrel 3 can be adapted, which has a wide application range.

In some embodiments, the rotating connection portion 223 includes a torsion portion 2231 and a U-shaped connection portion 2232; a first end and a second end of the torsion portion 2231 are respectively connected to the first elastic arm 221 and the second elastic arm 222; a third end and a fourth end of the torsion portion 2231 are respectively connected to two ends of the U-shaped connection portion 2232; the U-shaped connection portion 2232 is reversibly arranged in the fixing seat 212, and the U-shaped connection portion 2232 is relatively rotatably embedded in the rotating cavity 211. The first elastic arm 221 and the second elastic arm 222 are rotatably connected to the rotating cavity 211 via the U-shaped connection portion 2232, so as to obtain a larger flip space, to improve flexibility and to expand the reversible angular range.

In some embodiments, the limiting assembly 21 includes a fixing seat 212 and a limiting member 213; the fixing seat 212 is arranged opposite to the limiting member 213 and forms the rotating cavity 211; and a lower end of the limiting member 213 is pressed against the fixing end of the spring 22. By the cooperation of the fixing seat 212 and the limiting member 213, a rotating cavity 211 is formed between the two so as to limit the spring 22, thereby improving the stability of the spring 22 and ensuring that the movable end of the spring 22 can be stably flipped over.

In some embodiments, the fixing seat 212 includes a first side 2121, a second side 2122 and a third side 2123 arranged in sequence; and a relief notch 2131 is formed between the limiting member 213 and the first side 2121 and the third side 2123 of the fixing seat 212, respectively, for the spring 22 to flip over, thereby improving the reliability and flexibility of the spring 22 to flip over.

In some embodiments, the limiting member 213 includes a main body 2132 and a limiting block 2133; the limiting block 2133 is connected to the main body 2132 and is arranged opposite to the second side 2122 of the fixing seat 212; a lower end of the limiting block 2133 is provided with an extension portion, the extension portion and a bottom wall of the fixing seat 212, and a side wall of the main body 2132 opposite to the second side 2122 and the second side 2122 form a rotating cavity 211, so that the portion of the spring 22 is limited in four directions in the circumferential direction, improving the stability of the portion of the spring 22.

In some embodiments, the relief notch 2131 is provided with a stopper 23, and when the spring 22 is pressed against the stopper 23, an included angle formed between a plane where the spring 22 is located and a bottom of the fixing seat 212 ranges from 20° to 60°, i.e., an included angle formed between the plane where the spring 22 is located and the axial end face of the lamp body 1 ranges from 20° to 60°. The stopper 23 is configured to limit the flip angle α of the spring 22 so that the spring 22 does not lie completely flat with respect to the lamp body 1 to satisfy various demands of the user. Optionally, the angle is 20°, 25°, 30°, 35°, 40°, 45°, 50°, 55°, or 60°.

In some embodiments, the limiting assembly 21 includes a limiting snap 214, a base 215 and two symmetrically arranged supports 216; the supports 216 are arranged on the base 215; a side of the support 216 away from the base 215 is provided with a groove 2161 for supporting the spring 22, and the spring 22 is capable of being embedded in the groove 2161; an installation notch 217 is formed between the two supports 216, and the limiting snap 214 is arranged opposite to the installation notch 217, so that the limiting snap 214, the two supports 216 and the base 215 form the rotating cavity 211. The limiting snap 214 is provided for cooperating with the support 216, and the bottom surface of the limiting snap 214, the side wall of the support 216, the bottom wall of the base 215 and the side of the limiting snap 214 opposite to the elastic retaining arm 218 together form a rotating cavity 211, so that one end of the U-shaped connection portion 2232 is limited to rotate in the rotating cavity 211, with good stability and reducing the risk of the spring 22 from falling off.

In some embodiments, the limiting assembly 21 includes a limiting snap 214, a base 215 and an elastic retaining arm 218; the elastic retaining arm 218 is arranged on the base 215; the limiting snap 214 is arranged opposite to the plane where the elastic retaining arm 218 is located, and a movable notch for the spring 22 to move is formed between the elastic retaining arm 218 and the base 215. The bottom surface of the limiting protrusion 2141 of the limiting snap 214, the side of the limiting snap 214 opposite to the elastic retaining arm 218, and the elastic retaining arm 218 and the base 215 are enclosed to form a rotating cavity 211, and also play a role in limiting the movable range of the spring 22, so that the spring 22 can only flip over within the limited range; however, as the movable notch is provided, the upward flip angle of the spring 22 is limited, so that the flip angle of the spring 22 cannot reach 90°, which can satisfy various demands of the customers.

Referring to FIGS. 1-4, the first embodiment of the present disclosure is as follows:

- a down lamp, including a lamp body 1 and an elastic assembly 2; the lamp body 1 being provided with at least two symmetrically arranged elastic assemblies 2 in a radial direction; the elastic assembly 2, including a limiting assembly 21 and a spring 22; the limiting assembly 21 being provided with a rotating cavity 211, and a fixing end of the spring 22 being rotatably embedded in the rotating cavity 211, so that a flip angle of a movable end of the spring 22 ranges from 0° to 90°.

In some embodiments, the spring 22 includes a first elastic arm 221, a second elastic arm 222, and a rotating connection portion 223; the first elastic arm 221 and the second elastic arm 222 are connected via the rotating connection portion 223, and an obtuse angle is formed between the first elastic arm 221 and the second elastic arm 222; the rotating connection portion 223 is reversibly embedded in the fixing seat 212.

In some embodiments, the rotating connection portion 223 includes a torsion portion 2231 and a U-shaped connection portion 2232; a first end and a second end of the torsion portion 2231 are respectively connected to the first elastic arm 221 and the second elastic arm 222; a third end and a fourth end of the torsion portion 2231 are respectively connected to two ends of the U-shaped connection portion 2232; the U-shaped connection portion 2232 is reversibly arranged in the fixing seat 212, and the U-shaped connection portion 2232 is relatively rotatably embedded in the rotating cavity 211. Particularly, the cross bar of the U-shaped connection portion 2232 is rotatably embedded in the rotating cavity 211.

In the present embodiment, the limiting assembly 21 includes a fixing seat 212 and a limiting member 213; the fixing seat 212 is arranged opposite to the limiting member 213 and forms the rotating cavity 211; and a lower end of the limiting member 213 is pressed against the fixing end of the spring 22. The fixing seat 212 includes a first side 2121, a second side 2122 and a third side 2123 arranged in sequence; and a relief notch 2131 is formed between the limiting member 213 and the first side 2121 and the third side 2123 of the fixing seat 212, respectively, for the spring 22 to flip over. The limiting member 213 includes a main body 2132 and a limiting block 2133; the limiting block 2133 is connected to the main body 2132 and is arranged opposite to the second side 2122 of the fixing seat 212; a lower end of the limiting block 2133 is provided with an extension portion, the extension portion and a bottom wall of the fixing seat 212, and a side wall of the main body 2132 opposite to the second side 2122 and the second side 2122 form a rotating cavity 211.

Figure 5:
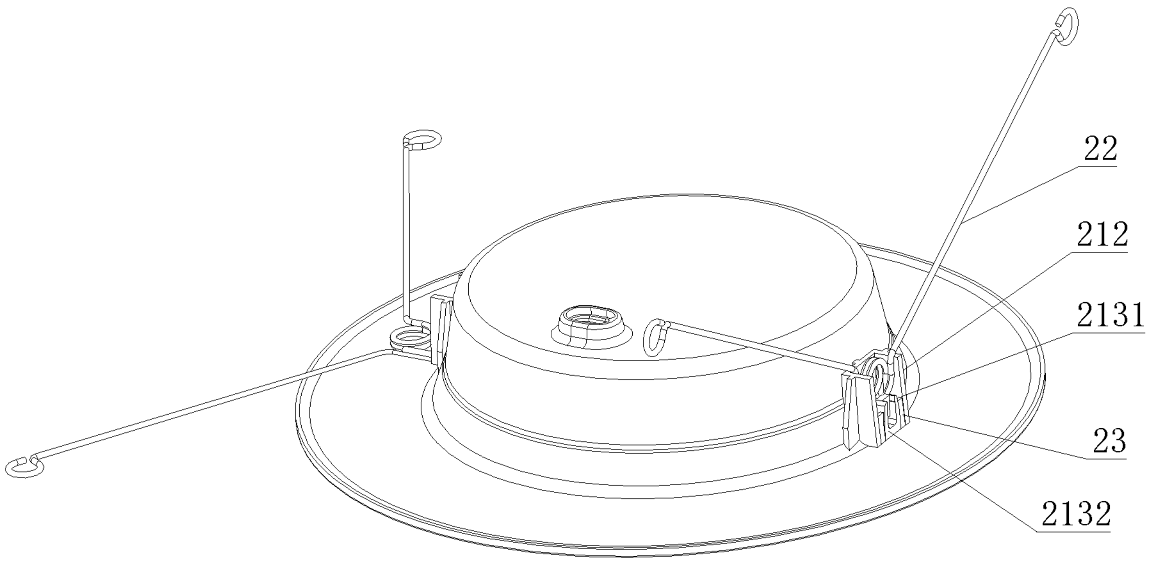
FIG. 5 is a schematic structural diagram and a partially enlarged view of a down lamp according to the second embodiment of the present disclosure.

Referring to FIG. 5, the second embodiment of the present disclosure is as follows.

The second embodiment differs from the first embodiment in that the flip angle of the spring 22 is reduced.

In the second embodiment, the relief notch 2131 is provided with a stopper 23, and when the spring 22 is pressed against the stopper 23, an included angle α formed between a plane where the spring 22 is located and a bottom of the fixing seat 212 is 30° or 55°, and the angle of the included angle depends on the height of the stopper 23, i.e., the angle of the included angle increases as the height of the stopper 23 increases, so that the spring 22 can only flip in the space formed between the stopper 23 and the second side 2122 of the fixing seat 212. Wherein the stopper 23 may be provided in one of the limiting assemblies 21, or the stopper 23 may be provided in both of the limiting assemblies 21.

Figure 6:
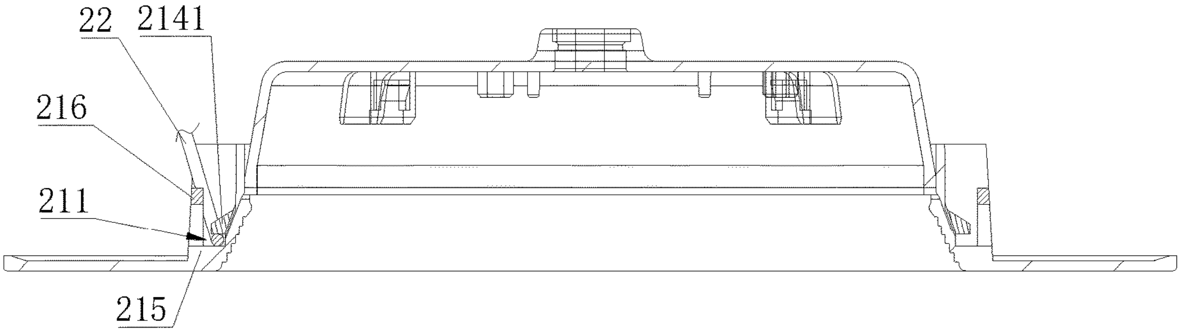
FIG. 6 is a cross-sectional view of a down lamp according to the third embodiment of the present disclosure.
Figure 7:
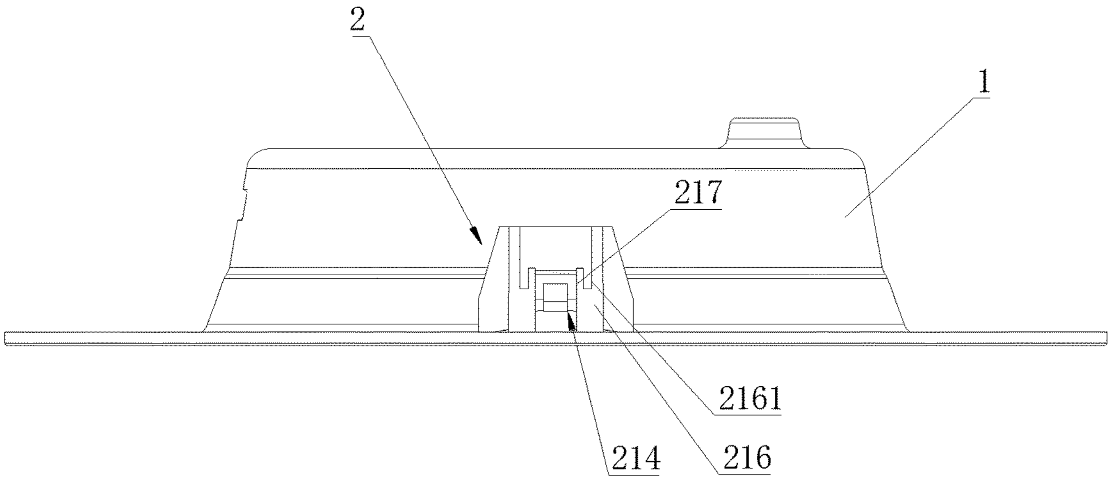
FIG. 7 is a schematic structural diagram of a limiting assembly according to the third embodiment of the present disclosure.

Referring to FIGS. 6-7, the third embodiment of the present disclosure is as follows.

The third embodiment differs from the first embodiment in that the structure of the limiting assembly 21 is different.

In the third embodiment, the limiting assembly 21 includes a limiting snap 214, a base 215 and two symmetrically arranged supports 216; the supports 216 are arranged on the base 215; a side of the support 216 away from the base 215 is provided with a groove 2161 for supporting the spring 22, and the spring 22 is capable of being embedded in the groove 2161; an installation notch 217 is formed between the two supports 216, and the limiting snap 214 is arranged opposite to the installation notch 217, so that the limiting snap 214, the two supports 216 and the base 215 form the rotating cavity 211. Particularly, the limiting snap 214 is provided with a limiting protrusion 2141, and a top of the limiting protrusion 2141 is an inclined plane, and the inclined plane gradually inclines from top to bottom. In the present embodiment, since the groove 2161 is provided, the flip angle of the spring 22 is limited, i.e., an included angle α formed between a plane where the spring 22 is located and a bottom of the base 215 ranges from 30° to 60°. Wherein, the limiting snap 214 is integrally formed with the side wall of the lamp body 1.

Figure 8:
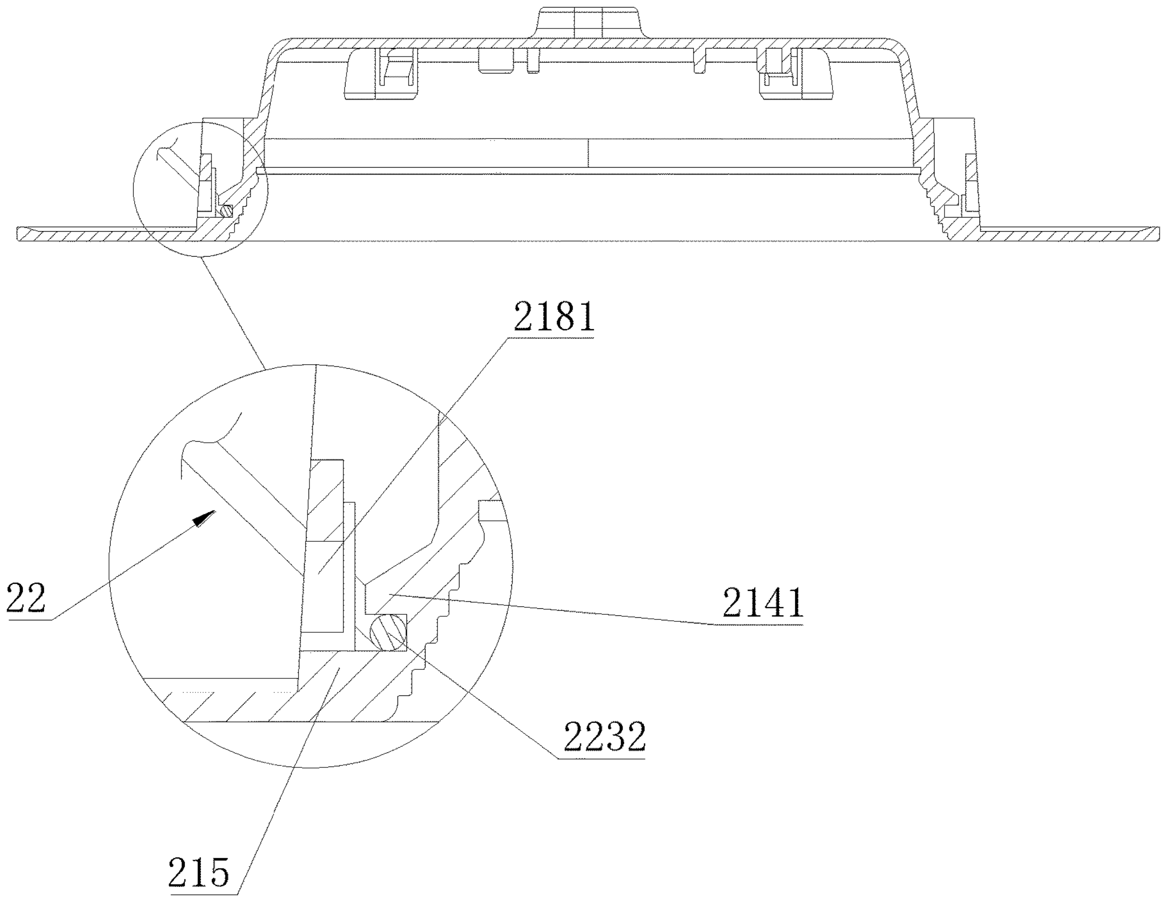
FIG. 8 is a cross-sectional view of a down lamp according to the fourth embodiment of the present disclosure.
Figure 9:
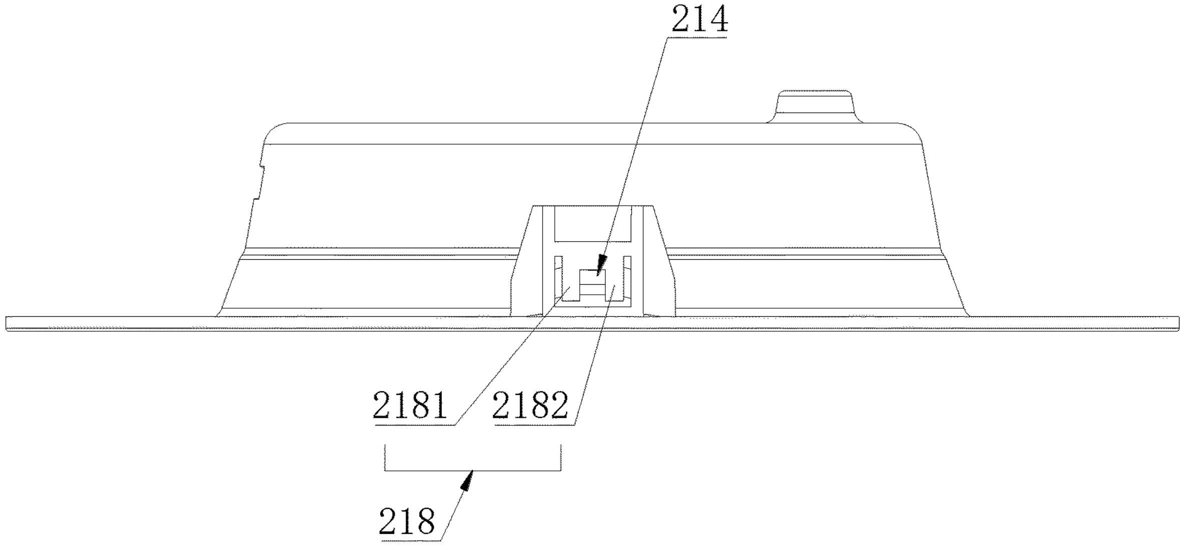
FIG. 9 is a schematic structural diagram of a limiting assembly according to the fourth embodiment of the present disclosure.

Referring to FIGS. 8-9, the fourth embodiment of the present disclosure is as follows.

The fourth embodiment differs from the first embodiment in that the structure of the limiting assembly 21 is different.

In the fourth embodiment, the limiting assembly 21 includes a limiting snap 214, a base 215 and an elastic retaining arm 218; the elastic retaining arm 218 is arranged on the base 215; the limiting snap 214 is arranged opposite to the plane where the elastic retaining arm 218 is located, and a movable notch for the spring 22 to move is formed between the elastic retaining arm 218 and the base 215. Particularly, the elastic retaining arm 218 includes a first retaining arm 2181 and a second retaining arm 2182, a notch is provided between the first retaining arm 2181 and the second retaining arm 2182, and the limiting snap 214 is arranged opposite to the notch between the first retaining arm 2181 and the second retaining arm 2182; the limiting snap 214 is provided with a limiting protrusion 2141, a top of the limiting protrusion 2141 is an inclined plane, and the inclined plane gradually inclines from top to bottom; and the cross bar of the U-shaped connection portion 2232 is embedded in the rotating cavity 211.

The foregoing description is merely the embodiments of the present disclosure and is not intended to limit the scope of the present disclosure. All equivalent changes made by using the contents of the specification and drawings of the present disclosure, or directly or indirectly applied in the relevant technical fields are to be embraced within the scope of patent protection of the present disclosure.

What is claimed is:

1. An elastic assembly, comprising a limiting assembly and a spring;

the limiting assembly being provided with a rotating cavity, and a fixing end of the spring being rotatably embedded in the rotating cavity, so that a flip angle of a movable end of the spring ranges from 0° to 90°;

wherein the limiting assembly comprises a fixing seat and a limiting member;

the fixing seat is arranged opposite to the limiting member and forming the rotating cavity;

a lower end of the limiting member is pressed against the fixing end of the spring.

2. The elastic assembly according to claim 1, wherein the fixing seat comprises a first side, a second side and a third side arranged in sequence;

a relief notch is formed between the limiting member and the first side and the third side of the fixing seat, respectively, for the spring to flip over.

3. The elastic assembly according to claim 2, wherein the limiting member comprises a main body and a limiting block;

the limiting block is connected to the main body and is arranged opposite to the second side of the fixing seat;

a lower end of the limiting block is provided with an extension portion, the extension portion and a bottom wall of the fixing seat, and a side wall of the main body opposite to the second side and the second side form the rotating cavity.

4. The elastic assembly according to claim 2, wherein the relief notch is provided with a stopper, and when the spring is pressed against the stopper, an included angle formed between a plane where the spring is located and a bottom of the fixing seat ranges from 20° to 60°.

5. The elastic assembly according to claim 1, wherein the spring comprises a first elastic arm, a second elastic arm and a rotating connection portion;

the first elastic arm and the second elastic arm are connected via the rotating connection portion, and an obtuse angle is formed between the first elastic arm and the second elastic arm;

the rotating connection portion is reversibly embedded in the fixing seat.

6. The elastic assembly according to claim 5, wherein the rotating connection portion comprises a torsion portion and a U-shaped connection portion;

a first end and a second end of the torsion portion are respectively connected to the first elastic arm and the second elastic arm;

a third end and a fourth end of the torsion portion are respectively connected to two ends of the U-shaped connection portion;

the U-shaped connection portion is reversibly arranged in the fixing seat, and the U-shaped connection portion is relatively rotatably embedded in the rotating cavity.

7. A down lamp, comprising a lamp body and the elastic assembly according to claim 1;

the lamp body being provided with at least two symmetrically arranged elastic assemblies in a radial direction.

8. An elastic assembly, comprising a limiting assembly and a spring;

the limiting assembly being provided with a rotating cavity, and a fixing end of the spring being rotatably embedded in the rotating cavity, so that a flip angle of a movable end of the spring ranges from 0° to 90°;

wherein the limiting assembly comprises a limiting snap, a base and two symmetrically arranged supports;

the supports are arranged on the base;

a side of the support away from the base is provided with a groove for supporting the spring, and the spring is capable of being embedded in the groove;

an installation notch is formed between the two supports, and the limiting snap is arranged opposite to the installation notch, so that the limiting snap, the two supports and the base form the rotating cavity.

9. A down lamp, comprising a lamp body and the elastic assembly according to claim 8;

the lamp body being provided with at least two symmetrically arranged elastic assemblies in a radial direction.

10. An elastic assembly, comprising a limiting assembly and a spring;

the limiting assembly being provided with a rotating cavity, and a fixing end of the spring being rotatably embedded in the rotating cavity, so that a flip angle of a movable end of the spring ranges from 0° to 90°;

wherein the limiting assembly comprises a limiting snap, a base and an elastic retaining arm;

the elastic retaining arm is arranged on the base;

the limiting snap is arranged opposite to a plane where the elastic retaining arm is located, and a movable notch for the spring to move is formed between the elastic retaining arm and the base.

11. A down lamp, comprising a lamp body and the elastic assembly according to claim 10;

the lamp body being provided with at least two symmetrically arranged elastic assemblies in a radial direction.

* * * * *